United States Patent
Shoham (10) Patent No.: US 11,467,899 B2
(45) Date of Patent: Oct. 11, 2022

(54) EFFICIENT CONTENT-ADDRESSABLE MEMORY LOOKUP RESULT INTEGRITY CHECKING AND CORRECTING OPERATIONS INCLUDING FOR PROTECTING THE ACCURACY OF PACKET PROCESSING OPERATIONS

(71) Applicant: Cisco Technology, Inc., San Jose, CA (US)

(72) Inventor: Doron Shoham, Shoham (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 167 days.

(21) Appl. No.: 15/954,488

(22) Filed: Apr. 16, 2018

(65) Prior Publication Data
US 2019/0317852 A1    Oct. 17, 2019

(51) Int. Cl.
*G06F 11/00* (2006.01)
*G06F 11/10* (2006.01)
*H04L 45/745* (2022.01)

(52) U.S. Cl.
CPC ...... *G06F 11/1004* (2013.01); *G06F 11/1048* (2013.01); *H04L 45/745* (2013.01); *H04L 45/74591* (2022.05)

(58) Field of Classification Search
CPC ............. G06F 11/1004; G06F 11/1048; G06F 17/30982; G06F 2207/5354; H04L 45/745; H04L 45/7457
USPC .................................................. 714/763, 759
See application file for complete search history.

(56) References Cited

U.S. PATENT DOCUMENTS

| | | | |
|---|---|---|---|
| 5,491,703 A * | 2/1996 | Barnaby | G11C 15/04 365/49.17 |
| 6,374,326 B1 | 4/2002 | Kansal et al. | |
| 6,389,506 B1 | 5/2002 | Ross et al. | |
| 6,526,474 B1 | 2/2003 | Ross | |
| 6,535,951 B1 | 3/2003 | Ross | |

(Continued)

OTHER PUBLICATIONS

Bremler-Barr et al., "PEDS: A Parallel Error Detection Scheme for TCAM Devices," IEEE/ACM Transactions on Networking, vol. 18, No. 5, Oct. 2010, IEEE, New York, New York (eleven pages).

(Continued)

*Primary Examiner* — Esaw T Abraham
*Assistant Examiner* — Osman M Alshack
(74) *Attorney, Agent, or Firm* — Polsinelli (57) ABSTRACT

In one embodiment, content-addressable memory lookup result integrity checking and correcting operations are performed, such as, but not limited to protecting the accuracy of packet processing operations. A lookup operation is performed in the content-addressable memory entries based on a lookup word resulting in one or more match vectors. One or multiple result match vectors are produced, depending on whether each of the content-addressable memory entries and the lookup word have been partitioned into multiple portions. An error accuracy code (e.g., error detection, error correction) is acquired for each portion of the one or multiple portions based on a corresponding portion of the lookup word. An accurate result is generated by processing each of the result match vector(s) with their corresponding error accuracy code. When using multiple portions, the (possibly corrected) result match vectors are combined into a single accurate result match vector.

17 Claims, 7 Drawing Sheets

(56) References Cited

U.S. PATENT DOCUMENTS

| | | | |
|---|---|---|---|
| 6,606,681 B1 | 8/2003 | Uzun | |
| 6,700,809 B1* | 3/2004 | Ng | G11C 15/00 365/236 |
| 6,715,029 B1 | 3/2004 | Trainin et al. | |
| 6,738,862 B1 | 5/2004 | Ross et al. | |
| 6,871,262 B1 | 3/2005 | Oren et al. | |
| 7,103,708 B2 | 9/2006 | Eatherton et al. | |
| 7,257,672 B2 | 8/2007 | Shoham et al. | |
| 7,260,673 B1 | 8/2007 | Ross | |
| 7,290,083 B2 | 10/2007 | Shoham et al. | |
| 7,305,519 B1 | 12/2007 | Nagaraj | |
| 7,345,897 B2 | 3/2008 | Krishnan et al. | |
| 7,349,230 B2 | 3/2008 | Parthasarathy et al. | |
| 7,350,131 B2 | 3/2008 | Trainin | |
| 8,856,435 B1* | 10/2014 | Shih | G11C 15/00 711/108 |
| 8,887,026 B2 | 11/2014 | Bremler-Barr et al. | |
| 2006/0080498 A1* | 4/2006 | Shoham | G11C 15/00 711/108 |
| 2007/0086227 A1* | 4/2007 | Krishnan | G11C 15/04 365/49.17 |
| 2007/0088909 A1* | 4/2007 | Krishnan | G11C 15/04 711/108 |
| 2007/0088910 A1* | 4/2007 | Parthasarathy | G11C 15/04 711/108 |
| 2009/0271570 A1* | 10/2009 | Burns | G06F 11/1064 711/108 |
| 2014/0059288 A1* | 2/2014 | Shoham | H04Q 11/0005 711/108 |
| 2014/0059289 A1* | 2/2014 | Shoham | G11C 15/00 711/108 |
| 2014/0149712 A1* | 5/2014 | Steiss | G06F 12/1009 711/206 |
| 2014/0181503 A1* | 6/2014 | Bettink | G06F 1/206 713/100 |
| 2014/0286072 A1* | 9/2014 | Lauer | G11C 15/00 365/49.17 |
| 2017/0206129 A1* | 7/2017 | Yankilevich | G11C 29/10 |

OTHER PUBLICATIONS

Isidoros Sideris and Kiamal Pekmestzi, "Cost Effective Protection Techniques for TCAM Memory Arrays," IEEE Transactions on Computers, vol. 61, No. 12, Dec. 2012, IEEE, New York, New York (eleven pages).

Shafiq et al., "TCAMChecker: A Software Approach to the Error Detection and Correction of TCAM-Based Networking Systems," Journal of Network and Systems Management, vol. 21 Issue 3, Sep. 2013, ACM, New York, New York (eighteen pages).

Rasmussen et al., "TCAM-based High Speed Longest Prefix Matching with Fast Incremental Table Updates," 2013 IEEE 14th International Conference on High Performance Switching and Routing (HPSR), Jul. 2013, IEEE, New York, New York (six pages).

* cited by examiner

EFFICIENT CONTENT-ADDRESSABLE MEMORY LOOKUP RESULT INTEGRITY CHECKING AND CORRECTING OPERATIONS INCLUDING FOR PROTECTING THE ACCURACY OF PACKET PROCESSING OPERATIONS

TECHNICAL FIELD

The present disclosure relates generally to content-addressable memories with error-protected matching results, including those used in forwarding packets in a network based on lookup results (e.g., longest prefix matching, exact match) in a hardware content-addressable memory (e.g., a binary or ternary content-addressable memory).

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Content-addressable memories are particularly useful in performing lookup operations in determining how to forward a packet in a network by a packet switching device. Errors can develop in data and/or masks stored in a content-addressable memory causing lookup operations to identify wrong packet processing information.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with content-addressable memory lookup result integrity checking and correcting operations, including, in one embodiment, for protecting the accuracy of packet processing operations.

One embodiment performs a lookup operation in the content-addressable memory entries based on a lookup word resulting in one or more match vectors. A single match vector or multiple match vectors are produced, depending on whether each of the content-addressable memory entries and the lookup word have been partitioned into multiple portions. An error accuracy code (e.g., error detection, error correction) is acquired for each portion of the one or multiple portions based on a corresponding portion of the lookup word. An accurate result is generated by processing each of the one or multiple match vectors with their corresponding error accuracy code, and then combining (e.g., ANDing each bit position) if more than one portion (e.g., then there are more than one match vectors).

In one embodiment, each of the one or more error accuracy codes is an error correction code (ECC); and wherein an error is corrected in one of the match vector(s) using a corresponding error accuracy code. In one embodiment, the content-addressable memory entries are binary content-addressable memory entries. In one embodiment, the content-addressable memory entries are ternary content-addressable memory entries. One embodiment includes updating a particular entry of the plurality of content-addressable memory entries to store a vector; and updating a corresponding one error correction code.

2. Description

The present disclosure relates generally to content-addressable memories (e.g., binary or ternary content-addressable memories) with error-protected matching results (e.g., longest prefix matching, exact match). As used herein, the term "content-addressable memory" ("CAM") refers to a hardware-based content-addressable memory in which vectors stored in valid/enabled multiple content-addressable memory entries are simultaneously compared against corresponding bits of a lookup word to generate a result match vector (which is then often provided to a priority encoder to determine a highest-priority matching entry). The term "content-addressable memory" ("CAM") includes different implementations, including a binary content-addressable memory (BCAM) and a ternary content-addressable memory (TCAM). One embodiment of a BCAM is implemented using TCAM entries, but not allowing a programmed vector to cause masking of any bits. One embodiment does not allow the programmed use of a block mask register (BMR) despite this capability of the CAM.

Herein, the programming or value of a content-addressable memory is referred to as a "vector." For a BCAM, the vector is typically a data value. For a TCAM, the vector is typically a data value and a mask value, with the mask value defining which bits are to be compared or ignored (e.g., wildcard bits) in a lookup operation. A content-addressable memory may have a global bit mask register which stores a global masking vector that effectively causes the masking of corresponding bits of each of multiple content-addressable memory entries or corresponding bits of the lookup word in a scope of the lookup operation (e.g., all enabled and valid entries in a block of entries) so they do not participate in the matching operation. A content-addressable entry matches a lookup word when all non-masked data bits of the vector populated therein match corresponding bits of the lookup word.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

Figure 1A:
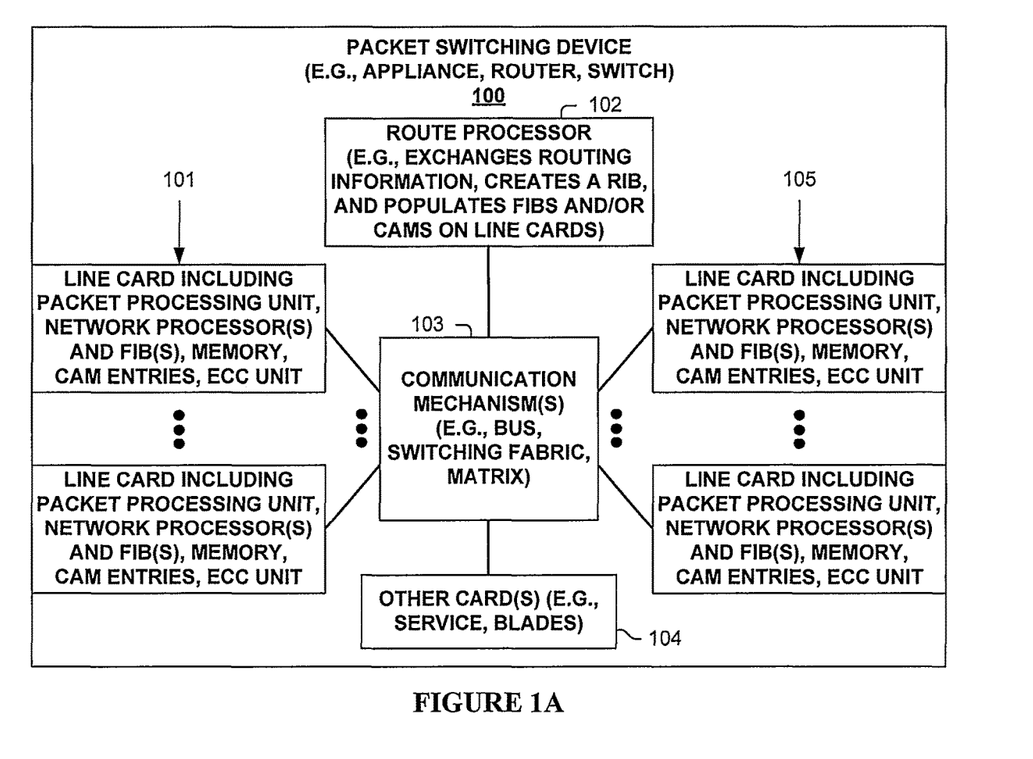
FIG. 1A illustrates a packet switching device including one or more content-addressable memories with error-protected matching results according to one embodiment.
Figure 1B:
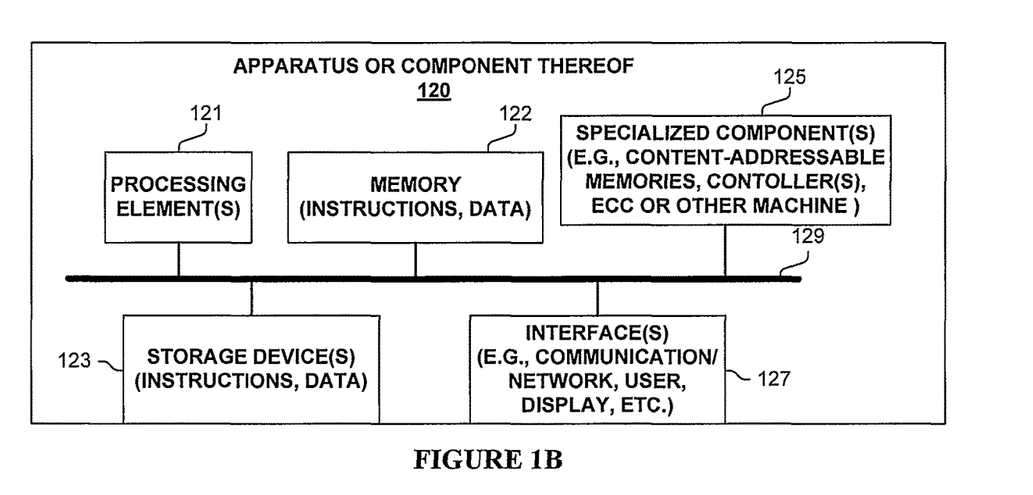
FIG. 1B illustrates an apparatus including one or more content-addressable memories with error-protected matching results according to one embodiment.

FIGS. 1A-B and their discussion herein are intended to provide a description of various exemplary packet switching systems used according to one embodiment that performs content-addressable memory lookup result integrity checking and correcting operations, including, in one embodiment, for protecting the accuracy of packet processing operations.

One embodiment of a packet switching device 100 is illustrated in FIG. 1A. As shown, packet switching device 100 includes multiple line cards 101 and 105, each with one or more network interfaces for sending and receiving packets over communications links (e.g., possibly part of a link aggregation group). In one embodiment, apparatus 100 performs one or more processes, or portions thereof, corresponding to one of the flow diagrams illustrated or otherwise described herein, and/or illustrated in another diagram or otherwise described herein.

Line cards 101 and 105 typically include one or more content-addressable memories (and possibly controller(s)) for performing lookup operations in determining packet processing information, error correction code machine(s), memory, and with one or more processing elements that are used in one embodiment associated with content-addressable lookup result integrity checking and correcting operations, including, in one embodiment, for protecting the accuracy of packet processing operations). Packet switching device 100 also has a control plane with one or more processing elements 102 for managing the control plane and/or control plane processing of packets. Packet switching device 100 also includes other cards 104 (e.g., service cards, blades) which include processing elements that are used in one embodiment to process packets (e.g., forward, drop, manipulate, throttle, police, schedule), and some communication mechanism 103 (e.g., bus, switching fabric, and/or matrix, etc.) for allowing its different entities 101, 102, 104 and 105 to communicate.

Line cards 101 and 105 typically perform the actions of being both an ingress and egress line card, in regards to multiple other particular packets and/or packet streams being received by, or sent from, packet switching device 100. In one embodiment, line cards 101 and/or 105 perform content-addressable lookup result integrity checking and correcting operations in determining how to ingress and/or egress process packets. Even though the term FIB includes the word "forwarding," this information base typically includes other information describing how to process corresponding packets (e.g., forward, drop, manipulate, throttle, police, schedule).

FIG. 1B is a block diagram of an apparatus 120 used in one embodiment associated with content-addressable lookup result integrity checking and correcting operations, including, in one embodiment, for protecting the accuracy of packet processing operations. In one embodiment, apparatus 120 performs one or more processes, or portions thereof, corresponding to one of the flow diagrams illustrated or otherwise described herein, and/or illustrated in another diagram or otherwise described herein.

In one embodiment, apparatus 120 includes one or more processor(s) 121 (typically with on-chip memory), memory 122, storage device(s) 123, specialized component(s) 125 (e.g. optimized hardware, content-addressable memory, controller(s), error correcting code machine(s)), and interface(s) 127 for communicating information (e.g., sending and receiving packets, user-interfaces, displaying information, etc.), which are typically communicatively coupled via one or more communications mechanisms 129 (e.g., bus, links, switching fabric, matrix), with the communications paths typically tailored to meet the needs of a particular application.

Various embodiments of apparatus 120 may include more or fewer elements. The operation of apparatus 120 is typically controlled by processor(s) 121 using memory 122 and storage device(s) 123 to perform one or more tasks or processes. Memory 122 is one type of computer-readable/computer-storage medium, and typically comprises random access memory (RAM), read only memory (ROM), flash memory, integrated circuits, and/or other memory components. Memory 122 typically stores computer-executable instructions to be executed by processor(s) 121 and/or data which is manipulated by processor(s) 121 for implementing functionality in accordance with an embodiment. Storage device(s) 123 are another type of computer-readable medium, and typically comprise solid state storage media, disk drives, diskettes, networked services, tape drives, and other storage devices. Storage device(s) 123 typically store computer-executable instructions to be executed by processor(s) 121 and/or data which is manipulated by processor(s) 121 for implementing functionality in accordance with an embodiment.

Figure 2A:
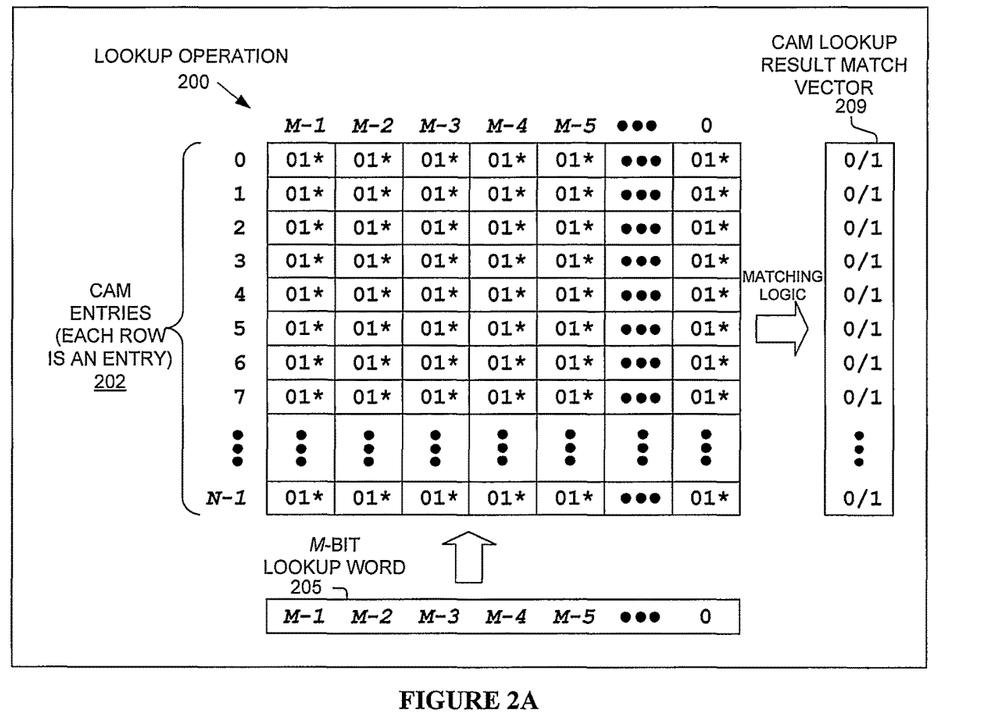
FIG. 2A illustrates a process according to one embodiment.

FIG. 2A illustrates a content-addressable memory lookup operation 200 according to one embodiment. Shown in FIG. 2A are N content-addressable memory entries 202, with each having M bits. In one embodiment, each of these N content-addressable memory entries 202 participate in lookup operations based on an M-bit lookup word 205. In one embodiment, these N content-addressable memory entries 202 represent only enabled/valid entries. In one embodiment, these N content-addressable memory entries 202 represent all entries, including entries (e.g., invalid/disabled) that do not participate in normal data lookup operations.

In one embodiment, a block mask value may be programmed into a block mask register (BMR) for a lookup operation 200 performed in a TCAM. The block mask register is used to mask bits so they do not participate in a lookup operation 200. The use of a '*' in FIG. 2 denotes a wildcard or don't care value, either as part of a TCAM stored vector or a result of being masked by a bit mask register.

Result match vector 209 is generated by lookup operation 200 by matching of each of the non-masked M-bit positions of enabled/valid CAM entries 202 (e.g., using their programmed vectors) to a bit value at corresponding bit positions of M-bit lookup word 205.

Figure 2B:
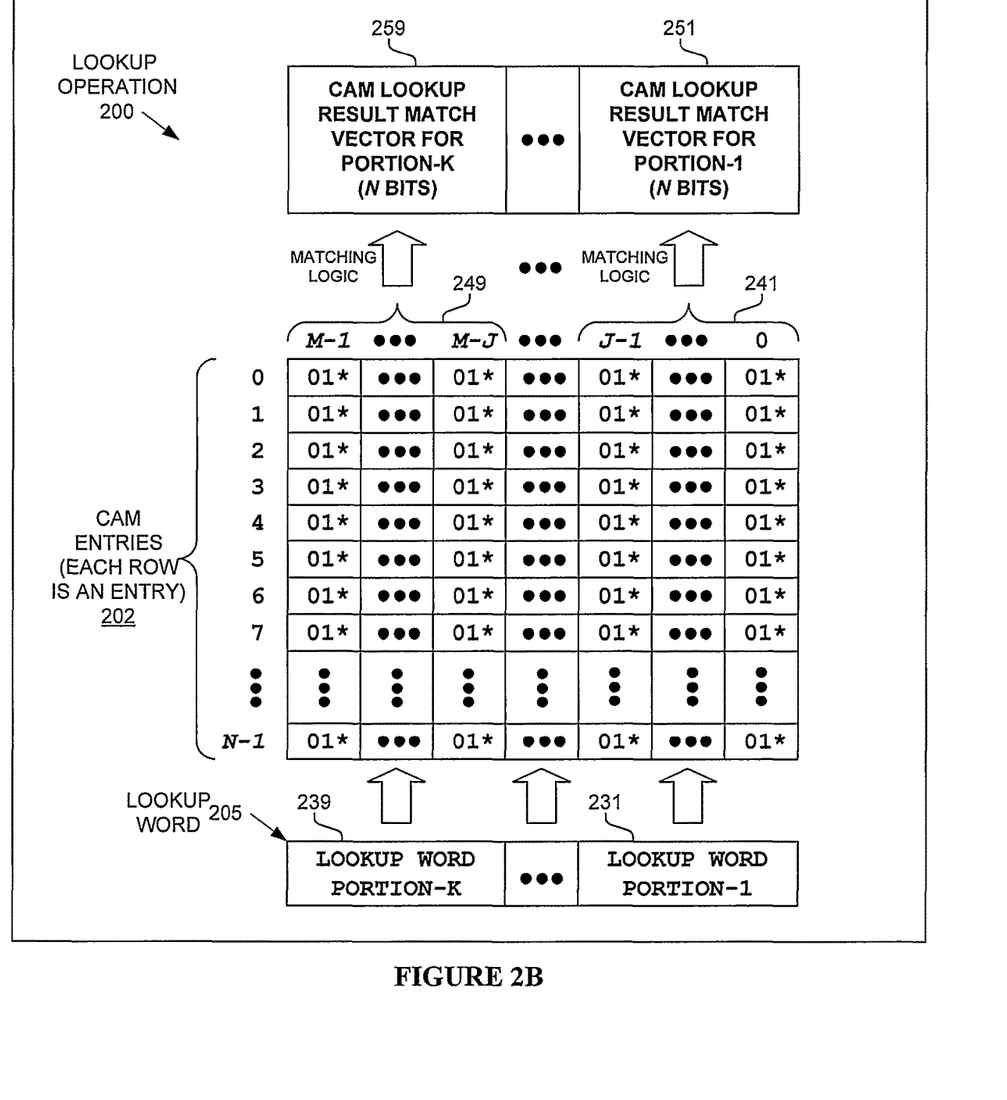
FIG. 2B illustrates a process according to one embodiment.

FIG. 2B illustrates processing of lookup operation 200 described in terms of portions according to one embodiment. The term "portion" is used herein to refer to one of K different portions of each of the content-addressable memory entries 202 (e.g., portions 241-249) and of the lookup word 205 (e.g., portions 231-239), with K being an integer of one or more. When K is one, there is one portion that refers the all bits of content-addressable memory entries 202 and lookup word 205 (e.g., as illustrated in FIG. 2A). When K is greater than one, there are multiple portions 241-249 of content-addressable memory entries 202 and multiple portions 231-239 of lookup word 205. In one embodiment and as denoted in FIG. 2B, each of the K portions (241-249, 231-239) has a width of J bits. In one embodiment, at least one portion (241-249, 231-239) has a different bit width than another of the K portions (241-249, 231-239).

Again, shown in FIG. 2B are K different portions 231-239 of lookup word 205 and corresponding K different portions 241-249 of content-addressable memory entries 202. Each portion spans a predetermined bit width in both the lookup word 205 and each of content-addressable memory entries 202. There is one result match vector 251-259 for each of the K portions. Each of these result match vectors 251-259 contains N bits, one bit for each of content-addressable memory entries 202 (which is also the same number of bits of result match vector 209 of FIG. 2A).

For any value of K, each particular content-addressable memory entry (202) matches lookup word 205 only when all non-masked bits of the particular content-addressable memory entry (202) matches corresponding bits of lookup word 205.

However, when K is greater than one, multiple (i.e., K) result match vectors 251-259 are generated by a lookup operation 200 to reflect the matching of content-addressable memory entries (202) for each portion 241-249 when compared to corresponding portions 231-239 of lookup word 205. Each particular content-addressable memory entry (202) matches lookup word 205 only when there is a match determined for each of the K portions for the particular content-addressable memory entry (202) as indicated by a corresponding bit position in each of result match vectors (251-259).

Further, one embodiment is associated with content-addressable memory lookup result integrity checking and correcting operations. Thus, one embodiment performs error detection and/or correction on content-addressable memory lookup result 209 of FIG. 2A. Thus, one embodiment performs error detection and/or correction on each of result match vectors 251-259, and then combines each of result match vectors 251-259 (possibly error corrected) to produce a single accurate matching result.

One embodiment uses multiple error accuracy codes (e.g., error protection code, error correction code). In one embodiment for each particular portion (241-249, 231-239), one error accuracy code is stored for each possible lookup word bit value for each bit of the content-addressable memory entry in the particular portion (241-249, 231-239). In one embodiment, there are the two possible bit values of one and zero for each bit of a BCAM entry 202; and there are the three possible bit values of one, zero, and don't care for each bit of a TCAM entry 202.

One embodiment having a single portion (i.e., K is one) and with each content-addressable memory entry 202 having a width of M-bits uses 2^M error accuracy codes for a BCAM, and 3^M error accuracy codes for a TCAM.

To greatly reduce the number of error accuracy codes used, one embodiment splits a lookup operation among K portions, each having a width of J bits, with K>1. One such embodiment uses K*2^J error accuracy codes for a BCAM, and K*3^J error accuracy codes for a TCAM.

One embodiment reduces the number of error accuracy codes required for a CAM by limiting the number of different bit positions of a content-addressable memory entry 202 that can be don't care (e.g., only allowing masking per eight bits to be zero, one, two, four, or eight-bit aligned).

In one embodiment, an error accuracy code is a Hamming Code which allows correction of some number of bits, while detection of an error in typically some larger number of bits. For example, a fourteen-bit Hamming Code can detect two errors and correct one error in an 8096-bit result match vector.

One embodiment uses a BCAM with entries 202 having a width of 48 bits. The BCAM uses six portions portion (241-249, 231-239) (e.g., K is six), each with a width of eight bits (e.g., J is eight). Each portion (241-249, 231-239) uses 2^8 (i.e., 256) error accuracy codes to detect and correct errors in each of the six result match vectors 251-259. Subsequent to any correction, these six accurate result match vectors 251-259 are combined (e.g., using XOR operations) into a single accurate match vector reflecting an accurate matching result of the entire width of each content-addressable memory entry 202. In one embodiment, the number of BCAM entries is 8096, and each error accuracy code being fourteen bits (e.g., for a Hamming Code to detect two errors and correct one error).

Thus, using multiple portions, one embodiment greatly reduces the number of error accuracy codes required for content-addressable memory lookup result integrity checking and correcting operations.

Figure 3A:
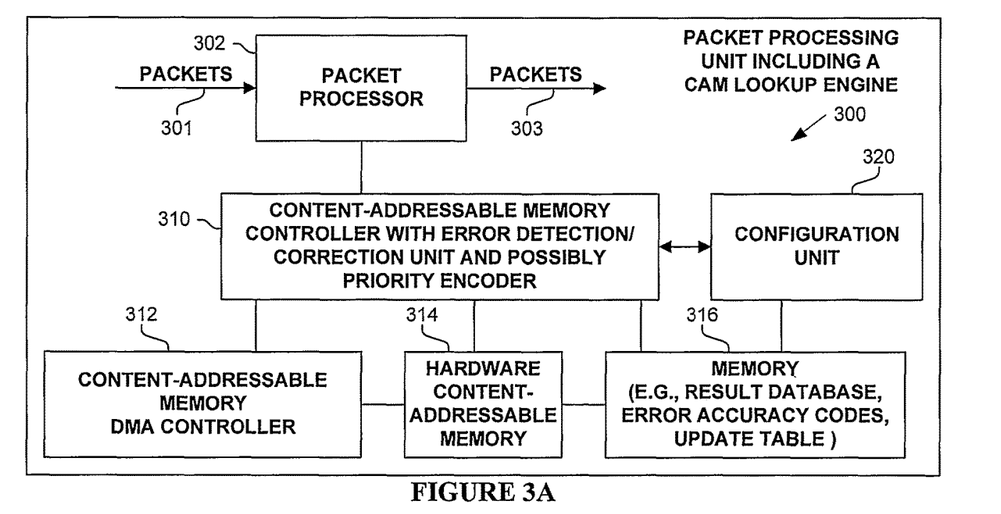
FIG. 3A illustrates a packet switching device including one or more content-addressable memories with error-protected lookup operations according to one embodiment.

FIG. 3A illustrates a packet processing unit including a content-addressable memory lookup unit 300 of one embodiment. Packet processor 302 receives and processes packets 301, and forwards non-dropped packets 303. The packet processing for a packet is based on the results of a lookup operation typically based on values extracted from a packet that identifies a stream to which the packet belongs.

Configuration unit 320 maintains one or more result databases in memory 316 (sometimes referred to as adjunct memory to content-addressable memory 314), and provides content-addressable memory controller 310 with instructions for updating hardware content-addressable memory 314. These instructions include, but are not limited to, vectors to populate (also referred to as store, program, insert, etc.) and at what locations in content-addressable memory 314, invalidate (also referred to as delete, remove) specified vectors in content-addressable memory 314, move specified vectors among entries in content-addressable memory 314, error accuracy codes. Content-addressable memory controller 310 uses content-addressable memory direct memory access (DMA) controller 312 to perform, inter alia, the actual movement of vectors among entries and insertion of vectors in entries of content-addressable memory 314.

In one embodiment, content-addressable memory controller 310 receives a lookup word from packet processor 302. Content-addressable memory controller 310 provides the lookup word to content-addressable memory 314, which performs a lookup operation with lookup result integrity checking and correcting operations thereon and returns a content-addressable memory lookup result, with a matching result then used to retrieve a lookup result from a corresponding database entry of memory 316. Content-addressable memory controller 310 receives the lookup result and provides it to packet processor 302.

Figure 3B:
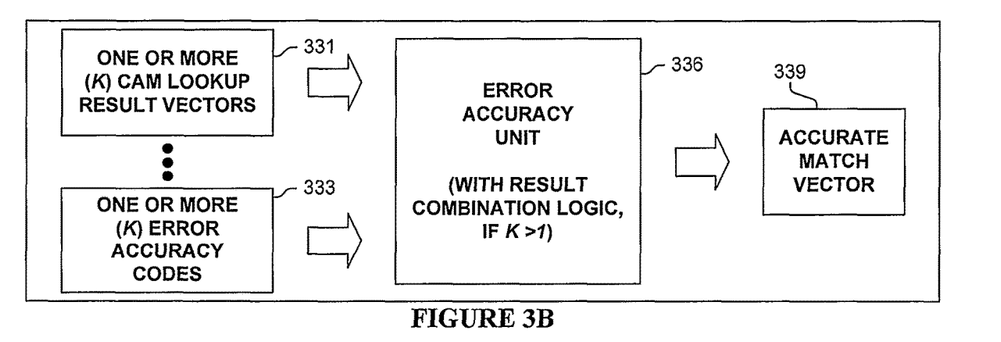
FIG. 3B illustrates a process according to one embodiment.

FIG. 3B illustrates a process associated with lookup result integrity checking and correcting operations according to one embodiment. A content-addressable memory lookup operation is performed based on corresponding portions of a lookup word in each of the K-portions of the content-addressable memory entries. The lookup operation produces K-result match vectors 331, which are provided to error accuracy unit 336. Additionally, each of the K portions of the lookup word is used to acquire a corresponding error accuracy code 333 (e.g., one for each of the K-result match vectors 331), with these K error accuracy codes provided to error accuracy unit 336. Accurate match vector 339 is generated by error accuracy unit 336, including by processing each of the K result match vectors with a corresponding error accuracy code; and if K is greater than one, the K result match vectors (after any error correction) are combined (e.g., via an AND operation on each bit) into the (single) accurate result match vector.

Figure 3C:
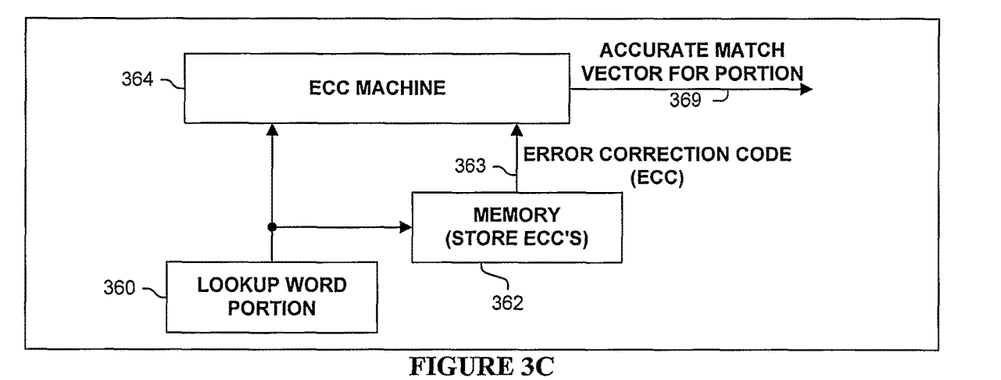
FIG. 3C illustrates elements using in processing according to one embodiment.

FIG. 3C illustrates a process associated with lookup result integrity checking and correcting operations according to one embodiment. For each lookup word portion 360, an error correcting code (ECC) machine 364 processes a corresponding lookup word portion 360 and error correcting code 363, which is acquired from memory 362 based on lookup word portion 360. This processing produces an accurate match vector 369 for the portion. If there is a single portion, accurate match vector 369 is the overall accurate result match vector; otherwise, accurate match vectors 369 (for all of the portions) are combined to generate the overall accurate result match vector.

Figure 4:
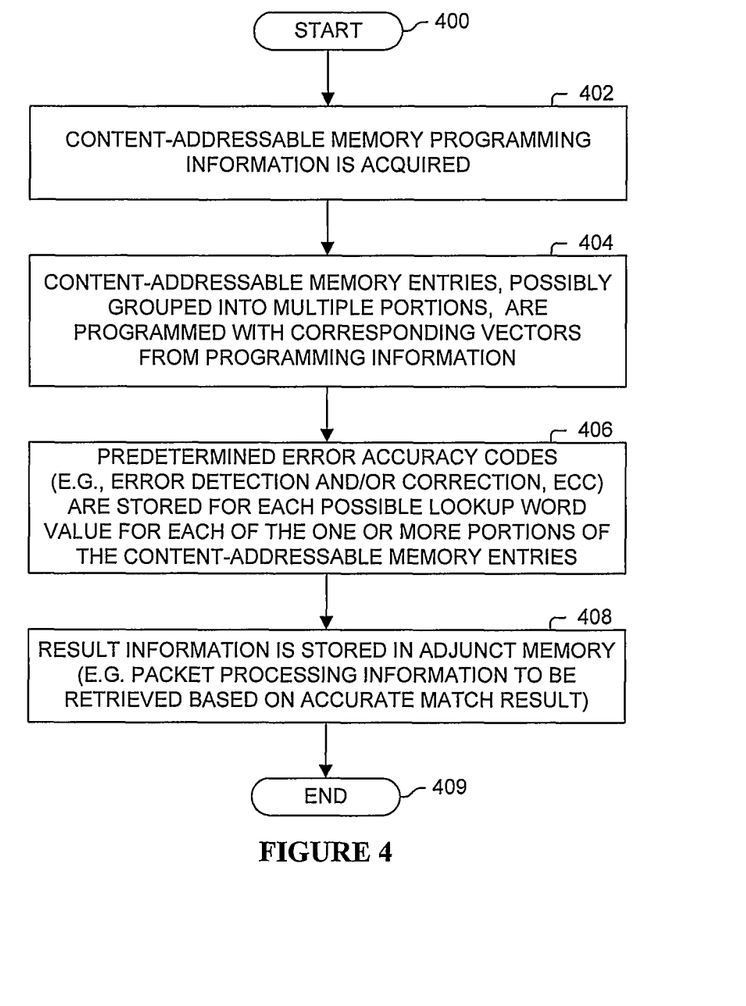
FIG. 4 illustrates a process according to one embodiment.

FIG. 4 illustrates a process according to one embodiment. Processing begins with process block 400. In process block 402, content-addressable memory programming information is acquired. In process block 404, corresponding entries of the content-addressable memory are programmed for each of the one or more portions. In process block 406, the error accuracy codes are stored, typically for each portion of each entry for each corresponding possible lookup word value. In process block 408, the result information is stored in adjunct memory (e.g., packet processing information to be retrieved based on the accurate match result). Processing of the flow diagram of FIG. 4 is complete as indicated by process block 409.

Figure 5:
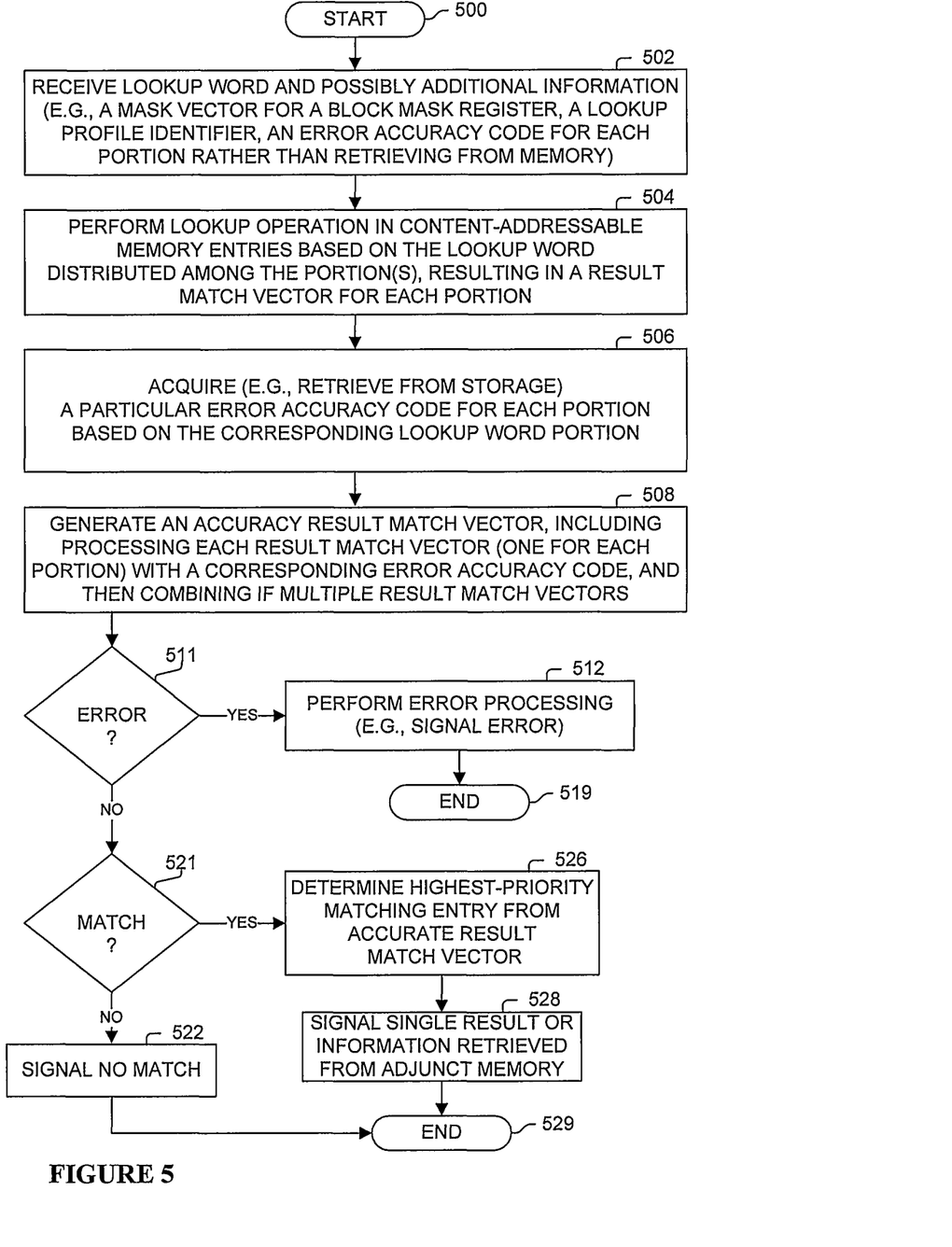
FIG. 5 illustrates a process according to one embodiment.

FIG. 5 illustrates a process according to one embodiment. Processing begins with process block 500. In process block 502, lookup information including a look word is received, possibly with additional information (e.g., a mask vector for a block mask register, a lookup profile identifier, an error accuracy code for each portion in one embodiment rather than retrieving from memory as part of the error processing).

In process block 504, a lookup operation is performed in the content-addressable memory entries based on the lookup word distributed among the one or more portions, resulting in a result match vector for each of the one or more portions.

In process block 506, an error accuracy code is acquired for each of the one or more portions. In one embodiment, each error accuracy code is acquired from a same or different memory based on a corresponding lookup word portion.

In process block 508, an accurate result match vector is generated by hardware of a content-addressable memory lookup engine, with said generating including processing the result match vector with the error accuracy code of each portion, and combining (possibly corrected) the result match vectors when there are multiple portions.

As determined in 511, if an error was identified in generating the accurate result match vector (e.g., by the processing performed in process block 508), then error processing is performed in process block 512; otherwise, processing proceeds to process block 521.

Continuing in process block 512, error processing is performed, typically including signaling identifying information for a corrected error (e.g., the accurate result match vector is correct) or non-corrected error (e.g., the accurate result match vector is not necessarily correct). This error signaling will typically trigger an error detecting and/or correcting operation for reprogramming the errored or possibly all content-addressable memory entries and/or other processing. A detected error typically will cease lookup operations until all entries are verified as correct, and/or other error processing. Processing of the flow diagram of FIG. 5 is completed as indicated by process block 519

Processing continues with process block 521. As determined in process block 521, if the accurate result match vector identifies at least one matching content-addressable memory entry, then processing proceeds to process block 526; otherwise processing proceeds to process block 522.

Continuing in process block 526, the highest-priority matching entry is determined from the accurate result match vector (e.g., by a priority encoder). In process block 528, the highest-priority matching entry is signaled, or processing information retrieved from an adjunct memory based on the highest-priority matching entry is signaled. Processing of the flow diagram of FIG. 5 is complete as indicated by process block 529.

Continuing in process block 522, a no-match is signaled, and processing of the flow diagram of FIG. 5 is complete as indicated by process block 529.

Figure 6:
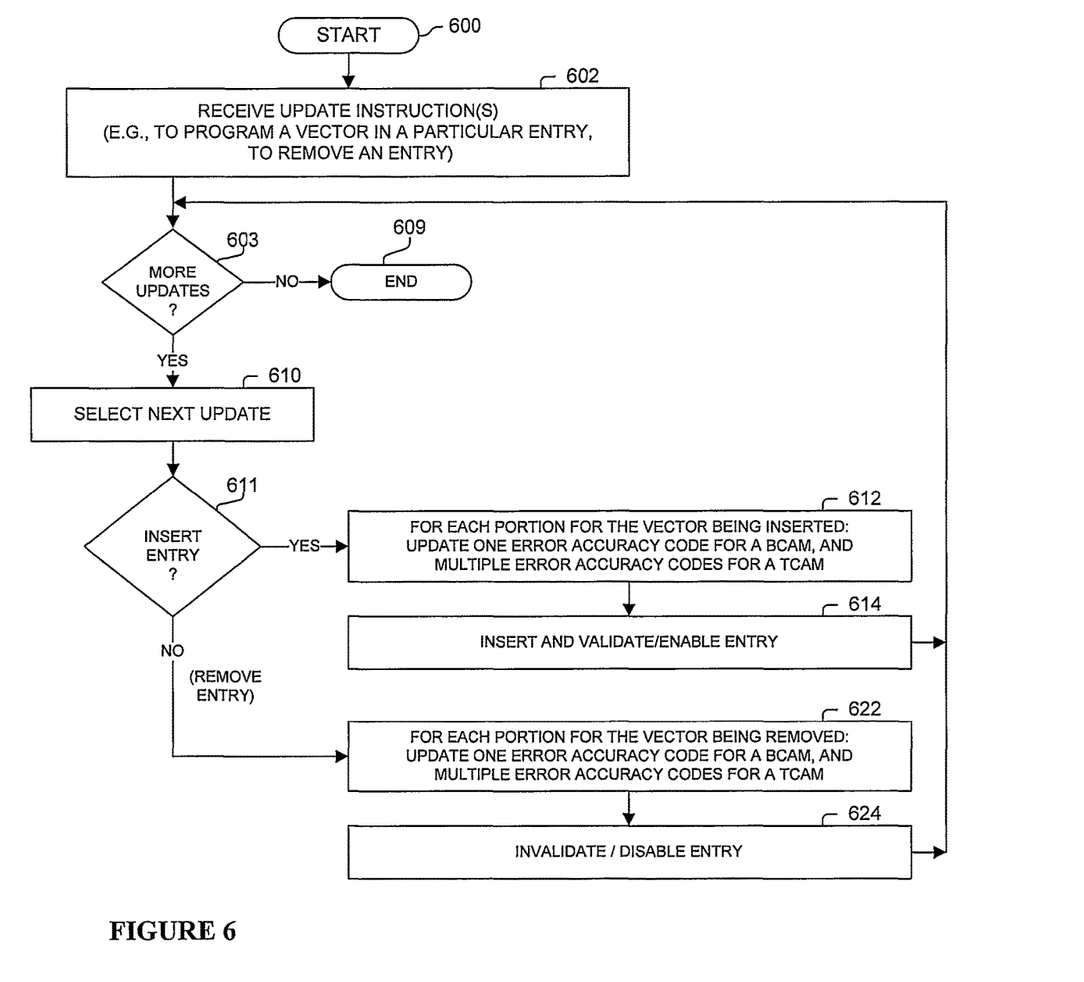
FIG. 6 illustrates a process according to one embodiment.

FIG. 6 illustrates a process, of one embodiment, performed to remove or insert one or more entries from a content-addressable memory associated with content-addressable memory lookup result integrity checking and correcting operations. In one embodiment, overwriting a valid entry with a new vector is performed via a remove entry operation followed by an insert entry operation. Further, one embodiment stores all of the error accuracy codes for a portion in a memory, and does so for each portion in a same or different memory.

Processing begins with process block 600. In process block 602 instructions are received (e.g., by a content-addressable memory controller) to remove and/or insert (including the new vector) one or more content-addressable memory entries.

As determined in process block 603, while there are more updates to perform, processing proceeds to process block 610 to select and process a next update; otherwise processing of the flow diagram of FIG. 6 is completed as indicated by process block 609.

Continuing with process block 610, a next update is selected.

As determined in process block 611, if an entry is to be inserted, then processing proceeds to process block 612; otherwise, processing proceeds to process block 622 to remove an entry.

Continuing with process block 612, one or more error accuracy codes are updated in each portion corresponding to the vector to be inserted in a particular content-addressable memory entry. For a BCAM, one particular error accuracy code is updated for each portion, with the particular error accuracy code determined based on the corresponding portion of the vector to be stored in the particular content-addressable memory entry. For a TCAM, multiple particular error accuracy codes are updated for each portion, with these particular error accuracy codes determined based on the mask bits of the vector being inserted and the block mask register value. In process block 614, the vector is stored in the content-addressable memory entry identified as the insertion entry. Processing returns to process block 603.

Continuing with process block 622, one or more error accuracy codes are updated in each portion corresponding to the vector to be removed from a particular content-addressable memory entry. For a BCAM, one particular error accuracy code is updated for each portion, with the particular error accuracy code determined based on the corresponding portion of the vector currently stored in the particular content-addressable memory entry. For a TCAM, multiple particular error accuracy codes are updated for each portion, with these particular error accuracy codes determined based on the mask bits of the vector currently stored in the particular content-addressable memory entry and the block mask register value. In process block 624, the particular content-addressable memory entry is invalidated (e.g., disabled so it effectively does not participate in lookup operations). Processing returns to process block 603.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
performing a single lookup operation in a plurality of content-addressable memory entries based on a single lookup word resulting in one or more match vectors, with each of said match vectors including an entry match result for each of the plurality of content-addressable memory entries; and
generating an accurate result match vector by hardware of a content-addressable memory lookup engine, with said generating including lookup result integrity processing each particular match vector of said one or more match vectors with a particular error accuracy code corresponding to said particular match vector;
wherein the plurality of content-addressable memory entries consists of N content-addressable memory entries, with N being an integer greater than one; wherein said entry match result is a single bit; and wherein each of said one or more match vectors consists of N bits.

2. The method of claim 1, comprising: said hardware of the content-addressable memory lookup engine acquiring from memory, based on the single lookup word, said particular error accuracy code for said each particular match vector.

3. The method of claim 2, wherein said particular error accuracy code for said each particular match vector is an error correction code (ECC); and wherein said lookup result integrity processing said one or more match vectors results in error correcting of a bit in a particular match vector of said one or more match vectors.

4. The method of claim 3, wherein each of the plurality of content-addressable memory entries is a binary content-addressable memory entry.

5. The method of claim 4, comprising updating a particular entry of the plurality of content-addressable memory entries to store a vector; and updating a corresponding one error correction code stored in said memory based on a current value of the corresponding one error correction code XOR'd with a particular error correction code of the vector.

6. The method of claim 1, wherein said particular error accuracy code for said each particular match vector is an error correction code (ECC).

7. The method of claim 6, wherein said lookup result integrity processing said one or more match vectors results in error correcting of a bit in a particular match vector of said one or more match vectors.

8. The method of claim 7, comprising:
determining the single lookup word based on a packet; and
processing the packet based on processing information acquired based on a matching content-addressable memory entry of the plurality of content-addressable memory entries identified as matching in the accurate result match vector.

9. The method of claim 1, wherein said particular error accuracy code for said each particular match vector is an error detection code.

10. The method of claim 1, wherein said one or more match vectors comprise a plurality of portion match vectors; and
wherein said performing the single lookup operation includes producing the plurality of portion match vectors using a content-addressable memory matching operation in each of a plurality of entry portions of the plurality of content-addressable memory entries based on a corresponding portion of the single lookup word; and
wherein said lookup result integrity processing each particular match vector of said one or more match vectors includes lookup result integrity processing each specific portion match vector of the plurality of portion match vectors with a specific error accuracy code corresponding to said specific portion match vector to generate a specific accurate portion result vector of a plurality of specific accurate portion result vectors; and
wherein generating the accurate result match vector includes combining each of the plurality of specific accurate portion result vectors.

11. The method of claim 10, comprising: said hardware of the content-addressable memory lookup engine acquiring from memory each of the plurality of specific accurate portion result vectors based on a corresponding portion of the single lookup word.

12. The method of claim 11, comprising:
determining the single lookup word based on a packet; and
processing the packet based on processing information acquired based on a matching content-addressable memory entry of the plurality of content-addressable memory entries identified as matching in the accurate result match vector.

13. The method of claim 12, wherein the matching content-addressable memory entry is the highest-priority entry of the plurality of content-addressable memory entries identified as matching in the accurate result match vector.

14. An apparatus, comprising:
a plurality of content-addressable memory operation portions that collectively perform a lookup operation on a lookup word in a plurality of content-addressable memory entries, with each of the lookup word and said content-addressable memory entries partitioned into a plurality of corresponding portions; wherein each of the plurality of content-addressable memory operation portions includes a plurality of content-addressable memory entry portions that store source vectors, matching logic to produce a portion match vector identifying the result of matching said source vectors in the plurality of content-addressable memory entry portions to a lookup word portion of the lookup word, error-correction unit to process the portion match vector and an error correction code (ECC) to produce an accurate portion match vector; and
a result combination logic that generating an accurate result match vector by combining said accurate portion match vector produced by each of the plurality of content-addressable memory operation portions.

15. The apparatus of claim 14, wherein each of the plurality of content-addressable memory operation portions retrieves the ECC from storage based on the lookup word portion.

16. The apparatus of claim 14, wherein each of the plurality of content-addressable memory entries is a binary content-addressable memory entry.

17. The apparatus of claim 14, wherein each of the plurality of content-addressable memory entries is a ternary content-addressable memory entry.

* * * * *